United States Patent [19]

Wideman

[11] Patent Number: 5,134,200
[45] Date of Patent: Jul. 28, 1992

[54] POLYMERS CONTAINING CHEMICALLY BOUND AMINE ANTIDEGRADANTS

[75] Inventor: Lawson G. Wideman, Tallmadge, Ohio

[73] Assignee: The Goodyear Tire & Rubber Company, Akron, Ohio

[21] Appl. No.: 594,788

[22] Filed: Oct. 9, 1990

[51] Int. Cl.$^5$ ............................................. C08F 8/32
[52] U.S. Cl. ......................... 525/332.8; 525/332.9; 525/333.1; 525/333.2; 525/338; 525/379; 525/383; 526/310; 526/312
[58] Field of Search ............... 525/332.8, 332.9, 333.1, 525/333.2; 526/310, 312

[56] References Cited

U.S. PATENT DOCUMENTS

| | | | |
|---|---|---|---|
| 3,234,283 | 2/1966 | Finch et al. | 260/583 |
| 3,513,200 | 5/1970 | Biale | 260/583 |
| 4,096,150 | 6/1978 | Berthoux et al. | 260/293.52 |

OTHER PUBLICATIONS

Augustine, R. L., Catalysis of Organic Reactions p. 381, (1985).
Jachimowicz, F., et al. Catalysis of Organic Reactions p. 429 (1984).
Ramp et al, Journal of Polymer Science, 4, p. 2267 (1966).
Mohammadi et al Polymer Preprints, 27, 2, p. 95, (1986).

*Primary Examiner*—Bernard Lipman
*Attorney, Agent, or Firm*—Bruce J. Hendricks

[57] ABSTRACT

There is disclosed a polymer consisting essentially of segmeric units, a portion of said units consisting of at least one segmeric unit having the structural formula:

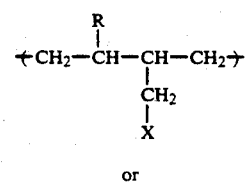

or

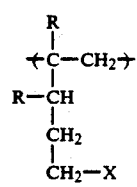

wherein X is selected from the group of monovalent radicals, consisting of:

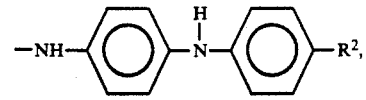

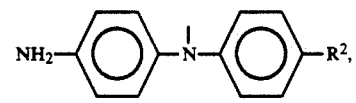

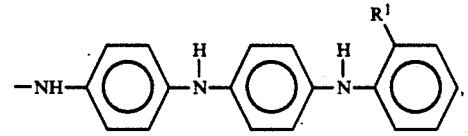

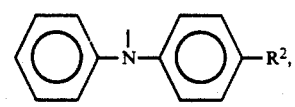

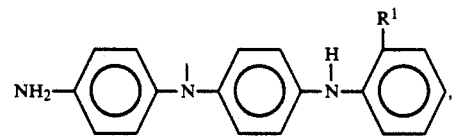

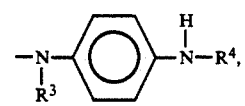

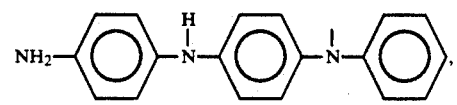

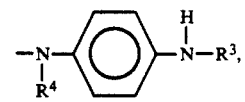

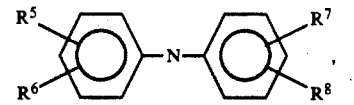

wherein R is hydrogen or methyl; $R^1$ is hydrogen or methyl; $R^2$ is selected from the group of radicals consisting of hydrogen, hydroxy, —$NH_2$; $R^3$ and $R^4$ are independently selected from the group of radicals consisting of alkyls having 3 to 12 carbon atoms, cycloaliphatics having 6 carbon atoms, aryls having 6 to 12 carbon atoms and aralkyls having 7 to 12 carbon atoms; and $R^5$, $R^6$, $R^7$ and $R^8$ are independently selected from the group of radicals consisting of hydrogen, hydroxy, alkyls having 1 to 20 carbon atoms and aralkyls having 7 to 12 carbon atoms.

15 Claims, No Drawings

POLYMERS CONTAINING CHEMICALLY BOUND AMINE ANTIDEGRADANTS

FIELD OF THE INVENTION

The present invention relates to polymers having chemically bound antidegradants. The polymers may be prepared by reacting a polymer having olefinic unsaturation with carbon monoxide and hydrogen under hydroformylation conditions in the presence of a hydroformylation catalyst, an organic reaction solvent and a primary or secondary amine containing antidegradant.

BACKGROUND OF THE INVENTION

The preparation of hydroformylated rubbers has been described in the prior art. For example, the hydroformylation of diene based polymers was disclosed in Rampe et al, J. Polymer Sc., Part A-1, 4, 2267-2279 (1966). In addition, the chemical modification of polybutadiene via homogeneous hydrogenation and hydroformylation was discussed in Mohammodi et al, Polymer Preprints, 27, No. 2, (September 1986). Whereas these polymers are known, there has yet to be any practical utility for these compounds.

After extensive research, it has been discovered, that hydroformylation of rubber in the presence of a primary or secondary amine antidegradant results in the antidegradant becoming chemically bound to the rubber via a methylene bridge. These new polymers not only broaden the applications for hydroformylated rubber but enhance the stability of sulfur vulcanizable rubber in the absence of imparting undesirable properties to the vulcanizate.

SUMMARY OF THE INVENTION

The present invention relates to a polymer containing segmeric units, a portion of which is derived from a primary or secondary amine containing antidegradant. These polymers may be used as is or be added to various other sulfur vulcanizable rubbers in place of or in combination with conventional antidegradants.

DETAILED DESCRIPTION OF THE INVENTION

There is disclosed a polymer consisting essentially of segmeric units, a portion of said units consisting of at least one segmeric unit having the structural formula:

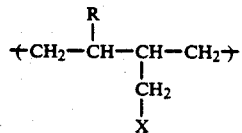

or

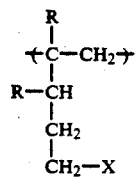

wherein X is selected from the group of monovalent radicals, consisting of:

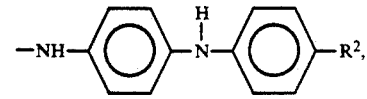

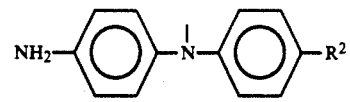

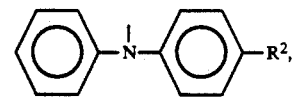

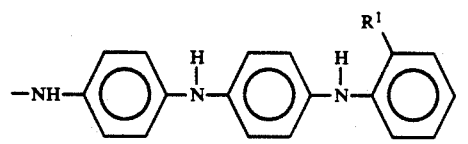

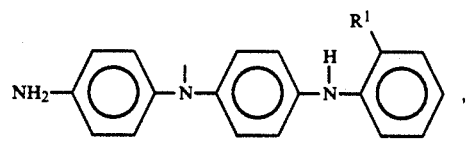

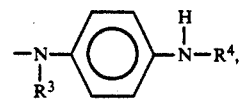

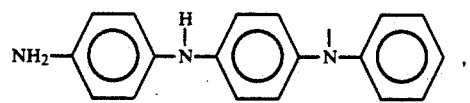

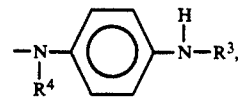

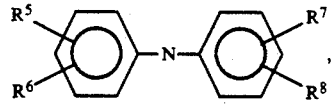

wherein R is hydrogen or methyl; $R^1$ is hydrogen or methyl; $R^2$ is selected from the group of radicals consisting of hydrogen, hydroxy, $-NH_2$; $R^3$ and $R^4$ are independently selected from the group of radicals consisting of alkyls having 3 to 12 carbon atoms, cycloaliphatics having 6 carbon atoms, aryls having 6 to 12 carbon atoms and aralkyls having 7 to 12 carbon atoms; and $R^5$, $R^6$, $R^7$ and $R^8$ are independently selected from the group of radicals consisting of hydrogen, hydroxy, alkyls having 1 to 20 carbon atoms and aralkyls having 7 to 12 carbon atoms. Preferably, R is hydrogen; X is:

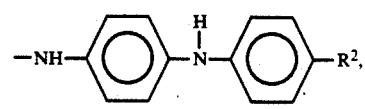

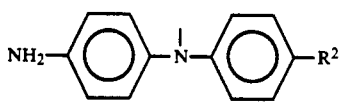

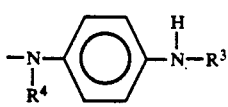

or

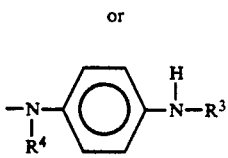

R¹ and R² are hydrogen; and R³ and R⁴ are independently selected from the group consisting of alkyls having 6 to 8 carbon atoms, aryls having 6 to 10 carbon atoms, cycloaliphatics having 6 carbon atoms and aralkyls having 6 to 8 carbon atoms.

The polymers may be prepared by reacting a polymer having olefinic unsaturation with carbon monoxide and hydrogen under hydroformylation conditions in the presence of a hydroformylation catalyst, an organic reaction solvent and a primary and/or secondary amine containing antidegradant. The phrase "polymer containing olefinic unsaturation" is intended to include both natural rubber and all its various raw and reclaim forms as well as various synthetic polymers. Representative synthetic polymers are the homopolymerization products of butadiene and its homologues and derivatives, as for example, methylbutadiene, as well as copolymers such as those formed from butadiene or its homologues or derivatives with other unsaturated organic compounds. Among the latter are acetylene e.g. vinyl acetylene; olefins, for example, isobutylene, which copolymerizes with isoprene to form polyisobutylene, also known as butyl rubber; vinyl compounds, for example vinylchloride, acrylic acid, acrylonitrile (which polymerize with butadiene to NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Included amongst the various synthetic rubbers are those prepared by the homopolymerization of isoprene and the copolymer of isoprene with other diolefins and various unsaturated organic compounds. In addition, synthetic rubbers such as EPDM, 1,4-cis polybutadiene and 1,4-cis polyisoprene may be used as well as polyhalogenated rubbers, i.e., chloroprene. The preferred rubbers are polybutadiene, polyisobutylene, EPDM, polybutadiene-styrene copolymers and polyisoprene. The preparation of the rubber prior to the hydroformylation reaction is according to general methods known to those skilled in the art and is not part of the present invention.

The polymer of the present invention consists essentially of segmeric units, a portion of which consists of at least one segmeric unit having the structural formula:

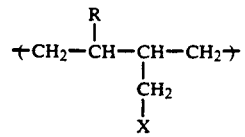

or

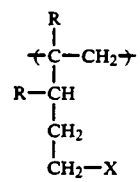

At least one of the segmeric units, also known as segmers, may range from about 0.1 to about 5 weight percent of the polymer. Preferably, at least one of the above segmers will range from about 1 to about 2 weight percent of the polymer. As discussed above, the remaining segmer or segmers of the polymer are derived from the polymerizable monomers.

The polymer containing olefinic unsaturation is reacted under hydroformylation conditions while in the presence of a mixed gas composed of carbon monoxide and hydrogen. Such gas is commonly known as water gas, syngas or oxo gas. The relative amounts of carbon monoxide and hydrogen which are initially present in the feed gas to the reactor may be varied over a wide range. In general, the mole ratio of carbon monoxide to hydrogen is in the range of between about 30:1 to about 1:30, preferably between about 15:1 and about 1:15 and most preferably between about 10:1 to about 1:10. It is to be understood, however, that molar ratios outside the stated broad range may be employed. In addition to hydrogen and carbon monoxide, other gases may be contained in the feed gas so long as they do not or are not present in sufficient amounts to detrimentally affect the hydroformylation reaction.

Conventional primary amine containing antidegradants may be used in the present invention. Representative of the primary amine containing antidegradants include p-amino-diphenylamine, p-hydroxy-p'-amino-diphenylamine, p-hydroxy diphenylamine, and p,p'-diamino-diphenylamine. Preferably, the primary amine antidegradant is p-amino-diphenylamine.

Conventional secondary amine containing antidegradants may be used in the present invention. Representative of the secondary amine containing antidegradants include N,N'-di-substituted-p-phenylene diamines of the formula:

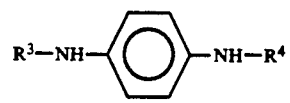

wherein R³ and R⁴ are independently selected from the group of radicals consisting of alkyls having 3 to 12 carbon atoms, cycloaliphatics having 6 carbon atoms, aryls having 6 to 12 carbon atoms, and aralkyls having 7 to 12 carbon atoms. Preferably, R³ is selected from the group of radicals consisting of alkyls having from 6 to 8 carbon atoms, aryls having 6 to 10 carbon atoms and aralkyls having 6 to 8 carbon atoms. Preferably, R⁴ is selected from the group of radicals consisting of alkyls having from 3 to 8 carbon atoms, cycloaliphatics having 6 carbon atoms, aryls having 6 to 10 carbon atoms and aralkyls having 6 to 8 carbon atoms. Specific examples of N,N'-di-substituted-p-phenylene diamines are N-phenyl-N'-(1,3-dimethylbutyl)-p-phenylenediamine, N-1,4-dimethylpentyl-N'-phenyl-p-phenylenediamine, N-phenyl-N'-isopropyl-p-phenylenediamine, N-phenyl, N'-(-methylheptyl)-p-phenylenediamine, N-phenyl-N'-cyclohexyl-p-phenylenediamine, mixed diaryl-p-phenylene-diamines, mixed dialkaryl-p-phenylenediamines, N,N'-diphenyl-p-phenylenediamine, N,N'-di-beta-naphthyl-p-phenylenediamine, N,N'-bis(1,4-dimethylpenty)-p-phenylenediamine, N,N'-bis(1-ethyl-3-methylpentyl)-p·phenylenediamine, N-o-tolyl-N'-phenyl-p-phenylenediamine, N,N-di-p-tolyl-p-phenylenediamine, N-1-methylpropyl-N'-phenyl-p-phenylenediamine, N,N'-bis(1-methylheptyl)-p-phenylenediamine and N,N'-bis-(1-methylpropyl)-p-phenylenediamine and 4,4'-bis-(di-alpha-methylbenzyl)-diphenylamine.

Additional secondary amine containing antidegradants which may be used include diphenylamine and diarylamine derivatives of the formula:

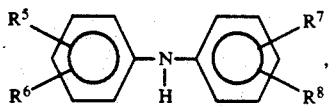

wherein $R^5$, $R^6$, $R^7$ and $R^8$ are independently selected from the group of radicals consisting of hydrogen, hydroxy, alkyls having 1 to 20 carbon atoms and aralkyls having 7 to 12 carbon atoms. Preferably, $R^5$, $R^6$, $R^7$ and $R^8$ are independently selected from the group consisting of hydrogen, hydroxy, alkyls having from 7 to 9 carbon atoms and aralkyls having 8 carbon atoms. Specific examples of these secondary amines include p-oriented styrenated diphenylamine, 4,4'-dioctyldiphenylamine, 4,4'-dinonyldiphenylamine and diheptyldiphenylamine, p-hydroxy-diphenylamine.

An organic solvent may be used to form a cement or suspension of the rubber. The solvent may also be used to suspend or dissolve the hydroformylation catalyst. The solvent is preferably inert to the hydroformylation reaction. Illustrative of solvents suitable for use in the practice of this invention include: saturated and aromatic hydrocarbons, e.g., hexane, octane, dodecane, naphtha, decalin, tetrahydronaphthalene, kerosene, mineral oil, cyclohexane, cycloheptane, alkyl cycloalkane, benzene, toluene, xylene, and the like; ethers such as tetrahydrofuran, tetrahydropyran, diethylether, 1,2-dimethoxybenzene, 1,2-diethoxybenzene, the mono- and dialkylethers of ethylene glycol, propylene glycol, butylene glycol, diethylene glycol, dipropylene glycol, oxyethyleneoxypropylene glycol, and the like; fluorinated hydrocarbons that are inert under the reaction conditions such as perfluoroethane, monofluorobenzene, and the like. Another class of solvents are sulfones such as dimethylsulfone, diethylsulfone, diphenolsulfone, sulfolane, and the like. Mixtures of the aforementioned solvents may be employed so long as they are compatible with each other under the condition of the reaction and will adequately provide a sufficient suspension or cement of the rubber and suspend or dissolve the hydroformylation catalyst and not interfere with the hydroformylation reaction.

The hydroformylation is conducted in the presence of a hydroformylation catalyst. Conventional hydroformylation catalysts may be used including Group VIII Noble metal-triarylphosphine complex catalysts. Group VIII Noble metal-triarylphosphine complex catalysts are prepared using Group VIII Noble metal compounds, for example, hydrides, halides, carboxylates, nitrates or sulfates, etc. and triarylphosphine by known processes. When using this complex catalyst for the reaction, the complex may be previously prepared from the Group VIII Noble metal compound and triarylphosphone and introducing to the reaction system or the Group VIII Noble compound and the triarylphosphine may be supplied to the reaction system separately to form the complex in the reaction system. Examples of the Group VIII Noble metal compounds that can be used for preparing the complexes include ruthenium compounds such as ruthenium trichloride or tetraminoruthenium hydroxychloride, etc.; rhodium compounds such as rhodium dicarboxylchloride, rhodium nitrate, rhodium trichloride, rhodium acetate or rhodium sulfate, etc.; palladium compounds such as palladium hydride, palladium chloride, palladium iodide, palladium nitrate, palladium cyanide, palladium acetate or palladium sulfate, etc.: osmium compounds such as osmium trichloride or chlorosmic acid. etc.; iridium compounds such as iridium tribromide, iridium tetrabromide, iridium trifluoride, iridium trichloride or iridium carbonyl, etc.; and platinum compounds such as platinic acid, platinous iodide, sodium hexachloroplatinate, or potassium trichloromonoethyleneplatinate, etc. As the triarylphosphine ligand, triphenylphosphie is most suitably used. However, it is possible to use various triarylphophines having substituents which are inactive with respect to the hydroformylation reaction, such as, for example, substituted triphenylphosphines having a lower alkyl group on the phenyl group such as tri-p-tolylphosphine, tri-m-tolylphosphine, trixylxylphosphine or tris(p-ethylphenyl) phosphine, and substituted triphenylphosphines having an alkoxy group on the phenyl group such as tris(p-methoxyphenyl) phosphine, etc. As is known by those skilled in the art, tertiary phosphines such as triarylphosphine, etc. may be allowed, in general, to coexist in the reaction system in order to improve thermal stability of the complex catalyst. The amount of such coexistence can be in excess of ten times to several hundred times (e.g., about 10 to 900) as a molar ratio, based on the moles of the complex catalyst in the reaction system. Other than the above, the hydroformylation catalyst may be a cobalt compound soluble in the reaction mixture. Particularly preferred cobalt compounds include cobalt hydrocarbonyls or cobalt carbonyls such as dicobalt octacarbonyl. Cobalt carbonyl may be prepared in situ by reaction of the syngas on various cobalt salts.

The amount of catalyst that is generally present may range from a concentration of from about 0.01 to about 2.0% by weight of the reaction mixture. Preferably, the hydroformylation catalyst will range from about 0.05 to about 0.5% by weight of the reaction mixture.

The hydroformylation can be effected over a wide temperature range from moderate to elevated temperature. In general, the hydroformylation reaction may be conducted at a temperature of between about 50° C. to about 150° C. The reaction temperature should not exceed 150° C. because in most cases, when operating at the lower end of the temperature range, it is desirable to utilize pressures at the higher end of the range. The preferred temperature range is from about 90° C. to about 120° C., while the most preferred temperature range is from about 95° C. to about 110° C.

The hydroformylation reaction is effected under superatmospheric pressure conditions. The pressure is produced by the hydrogen and carbon monoxide containing gas provided to the reactor. Pressures between 10 psig to about 2500 psig may be used to conduct the hydroformylation reaction. In the preferred embodiment, the hydroformylation reaction is conducted at a pressure range of from about 50 to about 250 psig. In addition to the partial pressures exerted by carbon monoxide and hydrogen, a partial pressure will be exerted by any inert gases that may be present in the syngas.

The hydroformylation conditions are continued for a period of time sufficient to produce the desired polymer having the attached amine containing antidegradant. In general, the reaction time can vary from minutes to several hours. If the more sluggish reaction conditions are selected, then the reaction time will have to be extended until the desired product is produced. It is appreciated that the residence time of the polymer will be influenced by the reaction temperature, concentration and choice of catalyst, total gas pressure, partial pressure exerted by its components, concentration and choice of solvent, and other factors. Desirably, the hydroformylation reaction is conducted until such time as from about 0.1% to about 5% of the polymer is functionalized by the primary or secondary amine on the remaining olefinic sites of the rubber. Preferably, the reaction is conducted until such time as from about 1% to about 2% of the polymer is functionalized with the amine antidegradant.

The hydroformylation of the rubber in the presence of the primary or secondary amine may be carried out in a batch, semi-continuous or continuous manner. The hydroformylation reaction may be conducted in a single reaction zone or in a plurality of reaction zones, in series or in parallel. The reaction may be conducted intermittently or continuously in an elongated tubular zone or in a series of such zones. The material of construction of the equipment should be such as to be inert during the reaction. The equipment should also be able to withstand the reaction temperatures and pressures. The reaction zone can be fitted with internal and/or external heat exchangers to control undo temperature fluctuations, or to prevent possible run-away reaction temperatures caused by the possible exothermic nature of the reaction. Preferably, an agitation means is available to ensure complete suspension of the polymer in the solvent. Mixing induced vibration, shaker, stirrer, rotating, oscillation, etc. are all illustrative of the types of agitation means which are contemplated for use in the present invention. Such agitation means are available and well known to those skilled in the art.

The polymer containing the chemically bound antidegradants reduces the chance of ozonolysis or oxidation compared to those same polymers not having the chemically bound antidegradants. In addition, these polymers may be added to conventional sulfur vulcanizable elastomers and reduce the tendency for degradation, i.e., oxidation and ozonlysis. The term "sulfur vulcanizable elastomer or rubber" as used herein embraces both natural rubber and all its various raw and reclaim forms as well as various synthetic rubbers. Representative synthetic polymers are the homopolymerization products of butadiene and its homologues and derivatives, as for example, methylbutadiene, dimethylbutadiene and pentadiene as well as copolymers such as those formed from butadiene or its homologues or derivatives with other unsaturated organic compounds. Among the latter are acetylene e.g. vinyl acetylene; olefins, for example, isobutylene, which copolymerizes with isoprene to form polyisobutylene also known as butyl rubber; vinyl compounds, for example vinylchloride, acrylic acid, acrylonitrile (which polymerize with butadiene to form Buna-N rubber), methacrylic acid and styrene, the latter compound polymerizing with butadiene to form Buna-S rubber, as well as vinyl esters and various unsaturated aldehydes, ketones and ethers, e.g., acrolein, methyl isopropenyl ketone and vinylethyl ether. Also included are the various synthetic rubbers prepared by the homopolymerization of isoprene and the copolymerization of isoprene with other diolefins and various unsaturated organic compounds. Also included are the synthetic rubbers such as 1,4-cis polybutadiene and 1,4-cis polyisoprene and similar synthetic rubbers such as EPDM. The preferred rubbers for use with the polymers of the present invention are polybutadiene, polyisobutylene, EPDM, polybutadiene-styrene copolymers and polyisoprene. It has been discovered that the polymer containing chemically bound antidegradants may be different from the rubber with which it is compounded. In fact, it has been discovered that a wide variety of properties may be achieved if the rubbers are different.

The polymers containing the chemically bound antidegradants may be used in a wide variety of proportions. Generally, the level of polymer containing the bound antidegradant may be added to the sulfur vulcanizable rubber may range from about 1 phr (parts per hundred rubber) to about 100 phr. Preferably, the amount added ranges from about 20 phr to about 80 phr.

The polymer containing the bound antidegradant may be compounded in either productive or nonproductive stock. Incorporation of the polymer into the sulfur vulcanizable rubber compound may be accomplished by conventional means of mixing such as by the use of Banburys, Brabenders. etc.

The polymer containing the bound antidegradant may be used with any conventional compounding additives such as carbon black, zinc oxide, antidegradants, processing oils, waxes, accelerators, sulfur vulcanizing agents and fatty acids. For the purposes of this invention, "sulfur vulcanizing agents" mean element sulfur or sulfur donating vulcanizing agents, for example, an amine disulfide or a polymeric polysulfide. Preferably, the polymers containing the bound antidegradant is used with free sulfur.

The following examples are presented in order to illustrate but not limit the present invention.

EXAMPLE 1

Forty grams of high vinyl polybutadiene (65% vinyl) as a cement in 400 grams of hexane was charged into a one-liter stainless steel autoclave containing 1.84 grams (1.3 mole percent) of p-aminodiphenylamine dissolved in 20 ml of toluene, and 100 mg of Co(CO) predissolved in 20 m of hexane. The reactor was swept with nitrogen gas and swept three times with 1:1 hydrogen:carbon monoxide syngas. The reactor was charged with about 100 psig of syngas and heated with stirring for 50 minutes at 100° C. and 200 psig of syngas pressure. The reactor was cooled and the cement of the aminoalkylated high vinyl polybutadiene was dried under reduced pressure at 50° C. to constant weight. The infrared spectroscopic analysis showed the presence of polyenamine and polyamine products. One gram of the rubber was extracted in 200 ml of acetone by shaking for two weeks in a ½ liter bottle. The dried rubber showed the persistence of the polyenamine and amine absorption bands.

EXAMPLE 2

A reaction was carried out under the conditions of Example 1 except 1.34 grams (0.65 mole percent) of N-1,3-dimethylbutyl-N'-phenylparaphenylene dissolved in 20 ml of toluene was added to the reactor as the antidegradant. After drying the rubber the infrared spectroscopic analysis shows polyenamine and polyamine absorption bands. One gram of the rubber was extracted in 200 ml of acetone by shaking in a ½ liter bottle for two weeks. The dried rubber showed the persistence of the polyenamine and polyamine absorption bands.

What is claimed is:

1. A polymer consisting essentially of segmeric units, a portion of said units consisting of at least one segmeric unit having the structural formula:

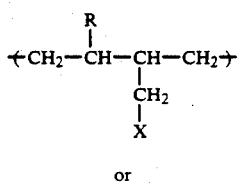

or

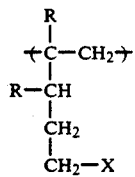

wherein X is selected from the group of monovalent radicals, consisting of:

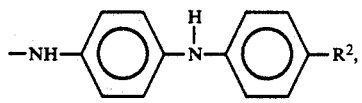

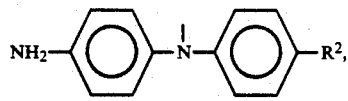

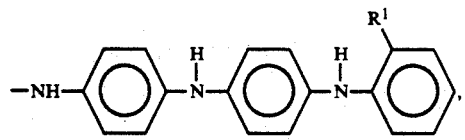

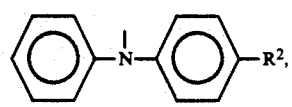

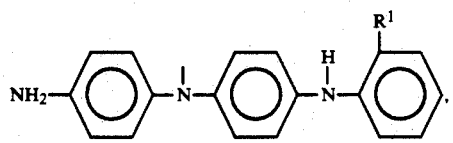

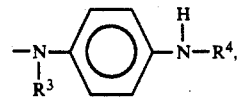

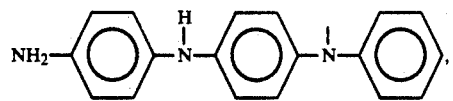

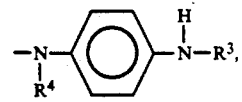

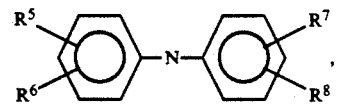

wherein R is hydrogen or methyl; $R^1$ is hydrogen or methyl; $R^2$ is selected from the group of radicals consisting of hydrogen, hydroxy, $-NH_2$; $R^3$ and $R^4$ are independently selected from the group of radicals consisting of alkyls having 3 to 12 carbon atoms, cycloaliphatics having 6 carbon atoms, aryls having 6 to 12 carbon atoms and aralkyls having 7 to 12 carbon atoms; and $R^5$, $R^6$, $R^7$ and $R^8$ are independently selected from the group of radicals consisting of hydrogen, hydroxy, alkyls having 1 to 20 carbon atoms and aralkyls having 7 to 12 carbon atoms.

2. The polymer of claim 1 wherein X is selected from the group of monovalent radicals consisting of:

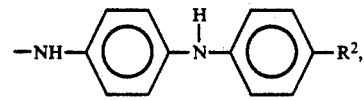

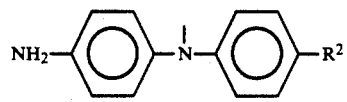

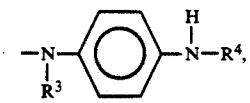

wherein $R^2$ is hydrogen and $R^3$ is an alkyl having 6 carbon atoms and $R^4$ is an aryl having 6 carbon atoms.

3. The polymer of claim 1 wherein the segmeric of the structural formula:

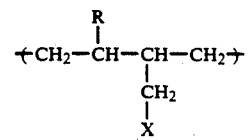

or

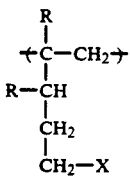

is from about 0.1 to about 5 weight percent of the polymer.

4. The polymer of claim 1 wherein said polymer is prepared by reacting a polymer having olefinic unsaturation with carbon monoxide and hydrogen under hydroformylation conditions in the presence of a hydroformylation catalyst, an organic reaction solvent and a primary and/or secondary amine containing antidegradant.

5. The polymer of claim 4 wherein said polymer having olefinic unsaturation is suspended in the organic solvent.

6. The polymer of claim 4 wherein said hydroformylation catalyst is dissolved in the organic solvent.

7. The polymer of claim 4 wherein said hydroformylation catalyst is a cobalt containing compound.

8. The polymer of claim 4 wherein said polymer having olefinic unsaturation is selected from the group consisting of natural rubber and synthetic rubbers.

9. The polymer of claim 8 wherein said synthetic rubber is selected from the group consisting of homopolymerization and copolymerization products of butadiene, isoprene or methylbutadiene.

10. The polymer of claim 8 wherein said synthetic rubber is a copolymerization product of butadiene and at least one member selected from the group consisting of vinyl acetylene, isobutylene, isoprene, vinylchloride, acrylic acid, acrylonitrile, methacrylic acid and styrene, acrolein, methyl isopropenyl ketone and vinylethyl ether.

11. The polymer of claim 8 wherein said synthetic rubber is selected from the group consisting of 1,4-cis polybutadiene, 1,4-cis polyisoprene and EPDM.

12. The polymer of claim 4 wherein said catalyst is a Group VIII Noble metal-triarylphosphine complex and the Group VIII Noble metal is selected from the group consisting of ruthenium, rhodium, palladium, osmium, iridium and platinum.

13. The polymer of claim 7 wherein said cobalt containing compound is selected from the group consisting of a cobalt carbonyl or cobalt hydrocarbonyl.

14. The polymer of claim 4 wherein the solvent is selected from the group consisting of saturated hydrocarbons, aromatic hydrocarbons, ethers, fluorinated hydrocarbons and sulfones.

15. The polymer of claim 4 wherein the primary or secondary amine antidegradant is selected from the group consisting of:
(a) p-amino-diphenylamine;
(b) p-hydroxy-p'-amino-diphenylamine;
(c) p,p'-diamino-diphenylamine;
(d) p-hydroxy-diphenylamine;
(e) N,N'-di-substituted-p-phenylenediamines of the formula:

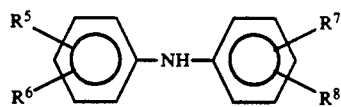

wherein $R^3$ and $R^4$ are independently selected from the group of radicals consisting of alkyls having 3 to 12 carbon atoms, aryls having 6 to 12 carbon atoms and aralkyls having 7 to 12 carbon atoms, and
(f) diphenylamines of the formula:

wherein $R^5$, $R^6$, $R^7$ and $R^8$ are independently selected from the group of radicals consisting of hydrogen, alkyls having 1 to 20 carbon atoms and aralkyls having 7 to 12 carbon atoms.

* * * * *